United States Patent [19]

Bryda

[11] Patent Number: 4,607,575
[45] Date of Patent: Aug. 26, 1986

[54] VARIABLE-PATH SURFACE TRANSPORT SYSTEM UTILIZING AN ANGLE COMPARATOR WITH A CONTROL GUIDEWAY OR EXTERNALLY SUPPLIED DATA FOR LATERAL OFFSET, AND METHOD

[76] Inventor: Roland Bryda, Kapellenstrasse 64, D-7500 Karlsruhe 1, Fed. Rep. of Germany

[21] Appl. No.: 644,547

[22] Filed: Aug. 27, 1984

[30] Foreign Application Priority Data

Aug. 27, 1983 [DE] Fed. Rep. of Germany ....... 3330993

[51] Int. Cl.⁴ ...................... B61B 10/00; B61B 11/00
[52] U.S. Cl. .................................. 104/304; 104/295
[58] Field of Search ............ 104/288, 287, 304, 244.1, 104/295, 170, 171, 88, 96

[56] References Cited

U.S. PATENT DOCUMENTS

| | | | |
|---|---|---|---|
| 2,677,331 | 5/1954 | Hauseman | 104/173 ST X |
| 4,366,756 | 1/1983 | Brum | 104/244.1 |
| 4,532,385 | 7/1985 | Friske | 104/170 X |

FOREIGN PATENT DOCUMENTS

| | | | |
|---|---|---|---|
| 559807 | 10/1957 | Belgium | 104/288 |
| 192131 | 11/1906 | Fed. Rep. of Germany | 104/295 |
| 2069432 | 2/1981 | United Kingdom | 104/288 |

OTHER PUBLICATIONS

"Fordertechnik a la Auto-Skooter-Materialfluss (Flow of Materials), Nov. 1981.

Primary Examiner—Robert B. Reeves
Assistant Examiner—Scott H. Werny
Attorney, Agent, or Firm—Frishauf, Holtz, Goodman & Woodward

[57] ABSTRACT

To permit lateral deflection of a transport vehicle or car (1) which receives electrical energy from an overhead system (56) and, additionally, is guided thereby by guide rails (6), a connecting element in form of a telescoping rod (4) or a tension spring (4a) connects the vehicle to the overhead system (56) to receive electrical energy and, additionally, guidance information. In accordance with the invention, a control guideway (12) is located, for example laterally adjacent the overhead system (56), the relative alignment of the guideway with respect to the control rails (6) being sensed by the roller (15) forming a reference element, which, upon change of level of the guideway with respect to the guide rails (6) causes deflection of a roller shaft (16) coupled to a joint (11), which deflection is measured in an angle measuring sensor (11a) and transmitted as an error signal to a comparator (101) which tends to reestablish a predetermined angular relationship, for example 90°, of the roller shaft (16) with respect to the connecting element, thereby causing lateral deviation of the vehicle upon servo control of a steering motor (17) therein.

20 Claims, 4 Drawing Figures

VARIABLE-PATH SURFACE TRANSPORT SYSTEM UTILIZING AN ANGLE COMPARATOR WITH A CONTROL GUIDEWAY OR EXTERNALLY SUPPLIED DATA FOR LATERAL OFFSET, AND METHOD

The present invention relates to an automatically controlled surface transport system, and more particularly to such a system suitable, for example, in factories, warehouses, and the like, in which a self-propelled, electrically driven vehicle, for example in form of a freight platform equipped with electrically driven wheels is steered along a predetermined path by a connecting rod which connects the vehicle to an overhead combination electrical energy supply conductor—direction control rail system. In such a system, a connecting rod or connecting cable which deflects transversely to the position of the vehicle with respect to the guide rails of the overhead system is coupled to a position sensor to provide control signals to a steering system on the vehicle to null the deflection, so that the vehicle will be steered to operate beneath the guide rail, that is, without transverse deflection of the connecting cable or connecting rod with respect to the guide rail. Such systems have been described in the literature, see, for example, "Materialfluss" ("Flow of Materials"), November 1981.

BACKGROUND

Surface transport systems have been proposed in which the vehicles or transport cars or transport dolleys are equipped with a vertically extending combination current pick-up and direction control rod to permit operation of the vehicle on floor surfaces, for example in warehouses, independently of tracks or the like laid into the floor of the warehouse. Rails or tracks laid into the floor of warehouses cause substantial costs, interfere with the smooth surface, and are sources of accidents. Further, it is difficult to change their position. It is, thus, desirable to provide load transport apparatus which can operate on a smooth surface. Internal combustion engines frequently cannot be used because of the resulting exhaust fumes; electric battery driven vehicles suffer the disadvantages of all battery energy supply: high cost, low efficiency, and limited range, coupled with a poor dead weight/load carrying ratio. Providing electrical energy by an overhead conductor, for example by a trolley wheel or slider from an overhead system, has the advantage that the transport apparatus can receive substantial power at minimum cost, operate at high efficiency, and yet be independent of any rail guidance since the connecting element, typically a rod or a tension cable, can be used simultaneously as a guide element for the vehicle. An overhead system is provided, located at a level of from between about 3 to 4 m (approximately 10-13 feet) above floor level, including electrical supply conductors and guide rails, which may be integrated with, or form part of an assembly of the supply conductors. The connecting element is coupled to a comparator, which may be located on the vehicle and which senses lateral deflection of the connecting element with respect to the position of the guide rail and/or electrical conductor mounted on the sealing. If such a deflection occurs, an error signal is generated which controls steered wheels or a steering wheel of the vehicle in a direction to null the transverse deflection, so as to place the vehicle precisely beneath the guide rail system. The steering control is simple—for example by a reversible electrical servo motor, receiving control signals via an amplifier from the deflection sensing element, so that deflection with respect to a reference is sensed.

The system has a substantial advantage: expensive and heavy batteries for drive of the vehicle are not needed, so that the vehicle can be operated essentially continuously, without down-time for recharging of batteries or replacement thereof by charged batteries. No installations in the floor surfaces in the form of guide cables and the like are needed, from which, for example, inductive signals could be picked up. The vehicle, thus, is cost-and energy-efficient and flexible.

Any automatic guidance system has an inherent disadvantage: The guidance along the directed path is determined by a mechanically installed element—a cable in the floor or, in an overhead system, the overhead current-and-guide rail arrangement. Changes in the guide path thus can be effected only by repositioning the respective guide elements. In case of an overhead system, it is necessary to disassemble the overhead electrical system from its support, reposition the system, and reassemble the system on a support, for example on transverse guide rods located in or on or beneath the ceiling of the respective warehouse or other installation. Change in the position of the guide path, thus, is comparatively expensive.

THE INVENTION

It is an object to permit controlled deviation of the vehicle from a given guide path without repositioning the overhead electrical energy supply-guide rail system, so that the vehicle can be controlled to operate in paths which are not exactly beneath the guide rails.

Briefly, an additional control guideway is placed adjacent the overhead system; a feeler is coupled to the connecting element, typically a connecting rod or a tension cable, to sense the relative position of the additional or further control guideway and the direction control rails. Deviation of the further control guideway with respect to the direction control rails from a reference alignment is determined in a comparator, for example coupled to the connecting element, to provide output signals for steering of the vehicle in a path which is aligned transversely with respect to a vertical line from the direction control rails.

The system permits limited lateral deflection of the vehicle from the position of the overhead system, so that an already installed or once positioned overhead system need not be the only control for the path of the vehicle or transport car or movable platform. The vehicle, thus, can be commanded to pass around obstructions, relocated machinery, to approach fixed loading platforms or other installations and the like. Repositioning of the overhead current supply conductor-direction control rail system thus is avoided.

In accordance with a preferred feature of the invention, the further control guideway comprises a control rail which has a vertical position, relative to the direction control rails, which changes in dependence on the desired deflection of the path of the vehicle. The relative vertical orientation of this further control guideway is sensed by a feeler, such as a roller element rolling on the further control guideway, which may be in form of a guide rail or track, and being vertically deflected in accordance with the position of the further control guideway. The vertical deflection is sensed by a reference element which, in turn, is coupled to a comparator which, in turn, is positionally stable with respect to the guide rails of the overhead energy supply conductor-direction control rail system, and any deviation of the reference elements from the fixed or reference position of the comparator is sensed thereby, and will result in a deviation output signal transmitted to the steering system to cause departure of the vehicle from vertical alignment with the combination current supply conductor-direction control rail overhead system. The connection element, preferably, is pivotably mounted for pivoting movement transverse to the direction of operation of the vehicle both on the vehicle and on the comparator, so that the same control unit, which controls steering and responds to steering error signals to null the error signal, can be used, the comparator which controls the zero setting merely being deflected as a whole under control of the reference element. The connection element, if a solid unit, may be a telescoping rod; if a cable, it may be a tensioned cable between a current pickup carriage or dolly running on electrical energy supply rails which, simultaneously, may form the direction control rails, and it may be kept under tension conditions, for example by a spring, mounted on the vehicle, if the vehicle is sufficiently heavy to maintain a tensioned orientation of the cable with the vehicle.

In accordance with the invention, thus, the previously used fixed, stiff connection between the transport vehicle and the control rails has been eliminated and, rather, a flexible connection, typically a pivotable connection, is used, coupled with a longitudinally telescoping or length -adjustable connection, so that the vehicle can operate on a path which clearly and definitely departs from one in vertical alignment with the direction control rails. The further control guideway provides both direction as well as distance information regarding the deflection of the path from the vertical alignment with the control rails. The reference element then functions as a command element for the steering deflection of the steering wheel or wheels on the vehicle. Upon reversion of the control guideway to a predetermined alignment position with respect to the direction control rails, the vehicle will again resume its normal path.

In accordance with a feature of the invention, additional steering of the vehicle can be obtained by signals not derived from the steering control system as such but, for example, externally applied, or stored in a memory on the vehicle. Transfer of command from the control system of the direction control rails and the further guideway to other signals can be effected, for example, upon generation of control signals which are applied through the energy supply conductors, by inductive or capacitative pickups, by sensing a stored path, for example stored in an ROM (read-only memory) or the like, as is well known in the field of automatic vehicle control.

DRAWINGS

DETAILED DESCRIPTION

Figure 2:
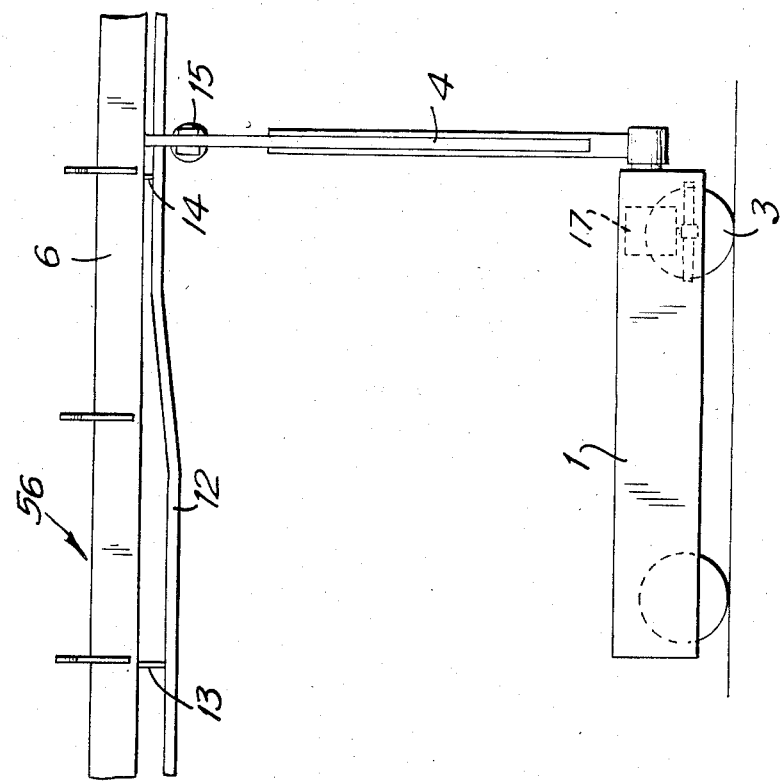
FIG. 2 is a side view of the system seen longitudinally with respect to the path of the vehicle.
Figure 1:
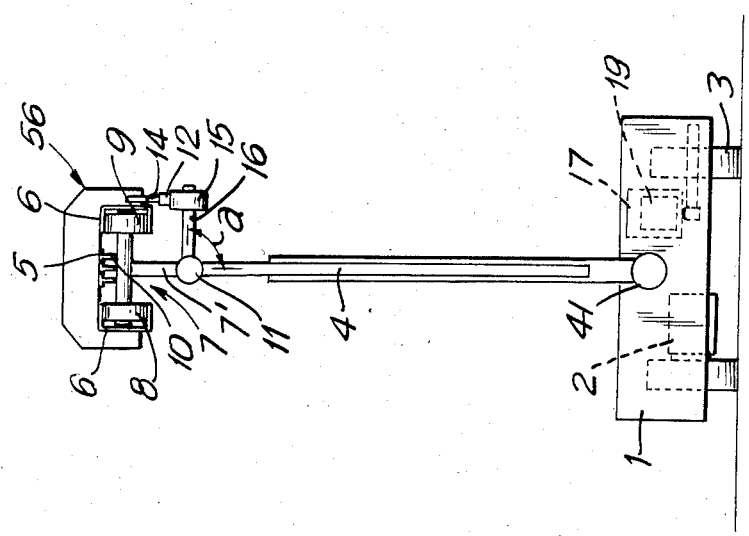
FIG. 1 is a schematic end view of the transport vehicle with the associated electrical energy supply conductors and direction control rails, looked at in the direction of the path of movement of the vehicle.
Figure 3:
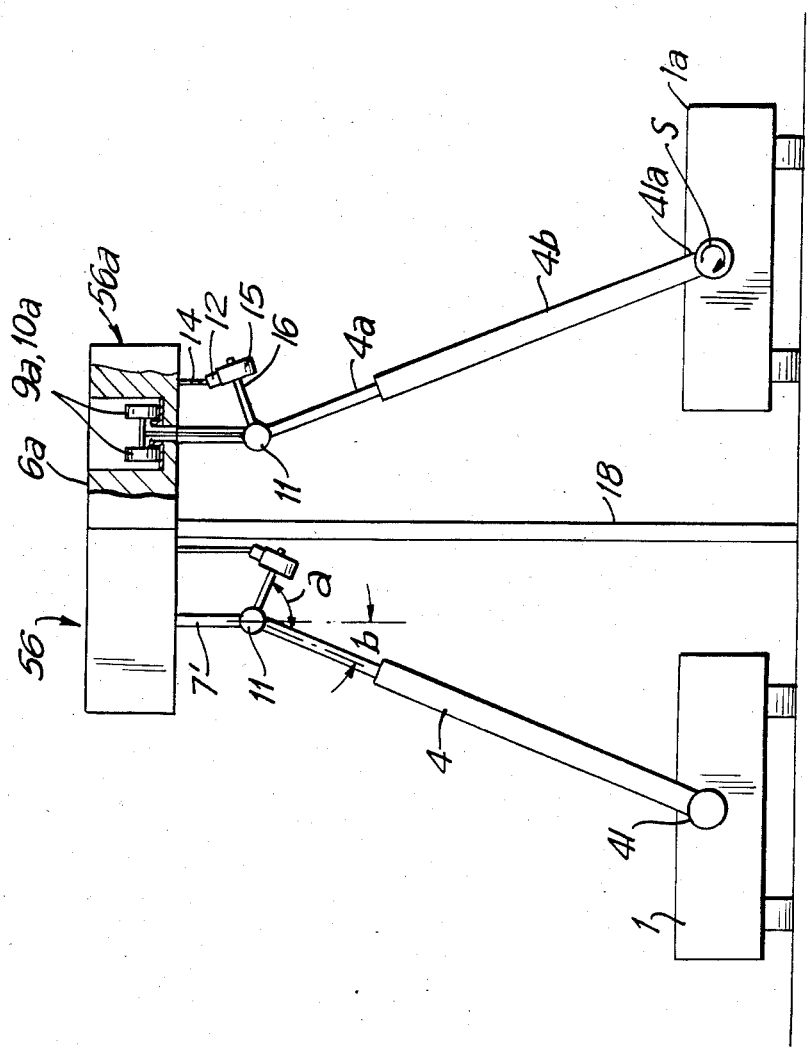
FIG. 3 is a view similar to FIG. 1, illustrating the operation of the deflection control system, and modification of the connecting element.

A transport car carriage 1 (FIGS. 1, 2) has a connecting element 4, shown in FIGS. 1 and 2 as a telescoping connecting rod, and in FIG. 3 as a cable 4a retained, in part, in a cable sleeve 4b, to connect the carriage 1 with an overhead system which includes current supply rails 5 and guide rails 6. The connecting rod 4 is connected to the car 1 by a lower swivel joint 41. If a cable is used, a swivel connection 41a permits lateral deflection about a longitudinal axis of the car 1, similar to the swivel joint 41. The current conductors 5 and the guide rails 6 are contacted by an upper carriage 7, which carries current pickup shoes 10 in electrical connection with the rails 5 and by axially spaced wheels 8, 9 which run in the rails 6. The car 1 carries drive motors 2 which drive selected axles or wheels of the vehicle or car 1, being powered by the electrical energy derived from the rails 5 and supplied over the shoes 10.

The carriage 7 is coupled to the connecting rod 4 or to the cable 4a, respectively, by a swivel joint 11 which permits swiveling of the element 4, 4a, respectively, at least in a direction transverse to the running direction of the vehicle 1, for example, with reference to FIG. 1, towards the right and left of the telescoping rod 4. The joint 11 is rigidly coupled to the carriage 7, for example by a depending connecting rod 7'.

In accordance with a feature of the invention, a control guideway 12 is provided, located preferably on or adjacent the upper guide rail assembly 56, which includes the current connecting rails 5 and the guide rails 6. The control guideway 12 is, preferably, constructed in the form of a rail which is height-adjustable by placing suitable differently dimensioned carriers 13, 14 (FIG. 2) on the upper guideway assembly 56, to form a cam track or camming curve, as best seen in FIG. 2. This further or auxiliary control guideway is engaged by a roller 15 which forms a reference element. The roller 15 is coupled to a link 16, which may form a shaft of the roller to the joint 11. Roller 15, thus, can be vertically pivoted on the joint 11 in accordance with the relative position of the further guideway 12 with respect to the guide rails 6. The joint 11 includes an angle sensing device to sense the angle a (see FIG. 3) between the arm 16 and the rod 4 or cable 4a. The vehicle is steered to hold this angle a at 90°.

BASIC OPERATION

In the position of the vehicle 1 shown in FIGS. 1 and 2, the vehicle 1 is vertically beneath the guide track 6 on the assembly 56. The rail 12 is at an intermediate level, so that the angle b between the vertical link 7', determining the orientation of the carriage 7, and the connecting element 4 will be 0°. The angle a between the connecting link 16 and the connecting element 4 will then be 90°. This is the position in which the vehicle or car 1 is to operate directly underneath the guide rail assembly 56, that is, no deviating path of the vehicle is desired.

Figure 4:
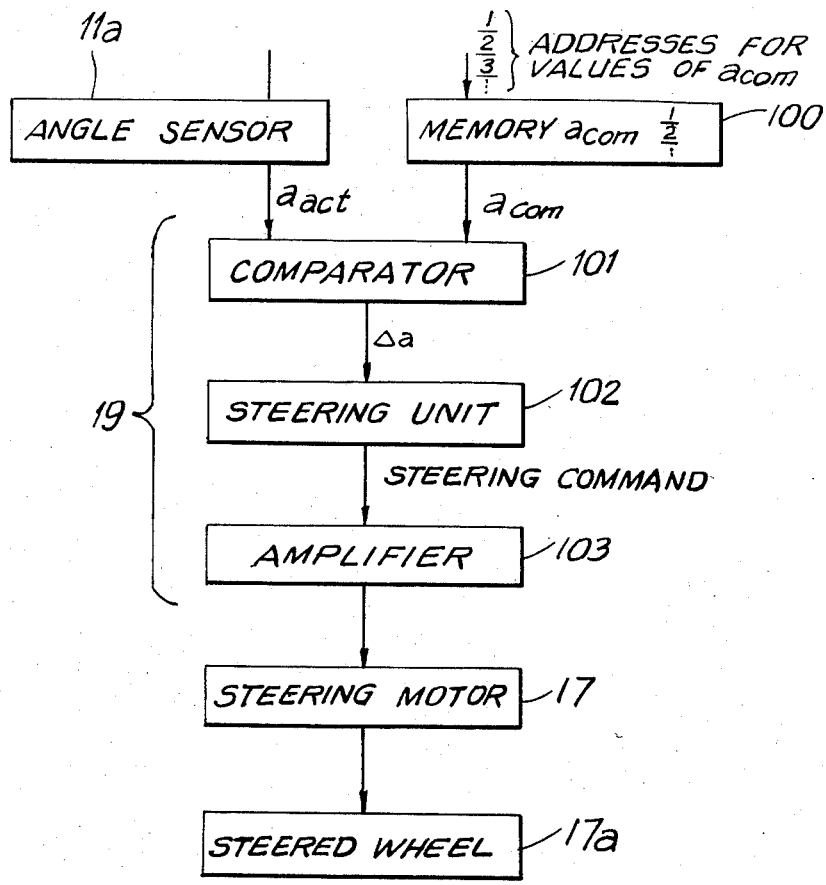
FIG. 4 is a flow diagram of operation of the control system.

The path of the vehicle, under these conditions, is monitored by a control system which operates in accordance with the control sequence illustrated schematically in FIG. 4. If the angle indicator in the joint 11 shows that the angle b between the connecting link 7' and the rod 4 is exactly 0°, the vehicle will be on the path which is desired, and no steering connection is necessary. This is the command value of the angle. Upon deviation of the angle from the command value, for example if a steered vehicle wheel meets an obstruction, the surface on which it runs is uneven or the like, so that the angle deviates from the command value, an error signal is generated which is recognized in a comparator within the control unit—known as such and forming a standard servo control—on the vehicle to generate a corresponding correcting steering command to a steering motor 17 located on the vehicle in order to null the error angle, and hence the error signal. Motor 17 is a standard steering motor, reversible, and, for example, may be a stepping motor or the like, in accordance with standard servo technology.

Operation in accordance with the present invention: If it is desired to deliberately vary the path, to cause the vehicle 1 to assume a position and run in a path different from that beneath the guide assembly 56, the control guideway 12 is changed in its level from that in which the link 16 is exactly 90° with respect to the connecting link 7′, for example deflected downwardly as shown on the left-hand portion of FIG. 2. The reference angle a then will be angle a between the shaft or link 16 and rod 4 or cable 4a. In all other respects, the steering control is unchanged. An elongated hanger 13 can then be interposed between the guide assembly 56 and the control guideway 12. This causes the follower roller 15, forming a reference element, to be tipped downwardly, and the angle a between the rod 4 and the downwardly extending link 7′ will first decrease, see FIG. 3, left side. The angle sensor on the joint 11 will now provide a signal representative of the angle a or of the angle b to the control unit on the car or vehicle 1 which will then steer the vehicle in a direction to null the error angle Δa with respect to a 90°-position of the shaft 16 relative to the orientation of the rod 4 or, which is the same, maintain the 90°-relationship between the angle of the link 16 and the connecting element 4, or 4a, 4b, respectively. The angle a thus should always be 90°, and any Δa deflection or deviation therefrom is transmitted as an error signal to the steering control motor 17, which will command one or two steered wheels of the vehicle or car 1 to place the vehicle into a position in which the relationship between the shaft 16 and the connecting element 4, 4a is always 90°. The vehicle, thus, will be steered in a laterally offset path, with respect to the assembly 56, as best seen in FIG. 3.

The vehicle can be returned to the path beneath the assembly 56, by raising the guideway 12 to the previous level, at which operation beneath the guideway 56 is commanded. An error signal in the other direction will be generated which will return the car 1 to the position shown in FIG. 1.

FIG. 3 illustrates an application of the system, in which the assembly 56 is secured to support posts 18. To permit clearing of the support posts, the vehicle is continuously operated laterally with respect to a path directly beneath the assembly 56. If the support posts 18 are sufficiently spaced, the vehicle may, of course, revert to a path directly beneath the assembly 56.

FIG. 3 illustrates, at the right side, another embodiment, in which the assembly 56 is replaced by an assembly 56a, and the car 1 by the car 1a, which has a spring, for example a spiral spring S, tensioning a cable 4a which, in turn, is connected to the joint 11. The guide tracks 6a support the wheels 9a, 10a from below to accept the tension of the spring S. The current pickups can be shaped in conventional form, or, if the guideway is at least partly insulated, the wheels may form the current pickups themselves. In operation, and in all other respects, the system at the right side of FIG. 3, which may, for example, guide the cars 1a in a path different from that of the cars 1, is identical to that described in connection with FIGS. 1 and 2. Both units 56, 56a can be carried on the same support posts 18.

The system is versatile and permits ready expansion by adding additional commands. FIG. 4 illustrates such an arrangement in which the angle a can be arbitrarily changed in accordance with a stored program. For example, a memory unit 100, shown schematically only in FIG. 4, and otherwise of standard construction, can be arranged to normally provide an output representative of a command angle $a_{com}$ of 90°. Deflection of the vehicle 1, 1a then is controlled by comparing the angle which the joint 11 senses with a reference, e.g. the shaft 16, the connecting link 7′, the rod or cable 4, 4a, or the like, with the command value. In a storage position, for example with address 1, the angle is 90°. Other angular values may, however, be entered in a program, the recall of which is controlled by control pulses which can be applied, for example to the pickup rails, and sensed in a control pulse sensing element, for example by filtering control information from electrical power energy transmitted by the rails 5 to the vehicle 1, in accordance with well known control technology. Further, if desired, external control pickups, as well known in automatic vehicle control systems, may be used, and connected to suitably control the memory 100 to provide, selectively, angle outputs from different memory locations shown in FIG. 4 as 1, 2, 3, to provide respective command angles $a_{com}$. The memory can be located on the vehicle 1, or externally thereof. The data which are thus generated and which control the vehicle steering motor 17 which, in turn, controls at least one steered wheel, e.g. a steered caster, can be derived either from the guideway 12 or from the memory 100. Consequently, the change in path can be controlled, either by suitable positioning of the guideway 12 at a level which controls an angle sensor 11a in joint 11 to change the pathway of the vehicle 1, 1′, or only based on data which are externally supplied, for example from the memory 100, or by sensing signals transmitted to or communicated to the vehicle 1. Rather than sensing the angle of deflection of the shaft 16, it is, of course, also possible to mount a stiff link extending towards the control guideway 12, and then measure, by distance measurement, the relative position of the guideway with respect to the guide assembly 56, 56′, at any individual or discrete position. Angle measurement, of course, is well known and can be done by a slider potentiometer and tapping an analog voltage from the potentiometer in dependence on its angular setting; similarly, linear deflection can be sensed by a linear potentiometer. Other systems and for example digital systems may be used, as well known in control technology in this field.

The system has the advantage that the vehicle or car 1 is independent of batteries, yet does not require a fixed association of the pathway of the vehicle with the orientation of the guide track assembly 56, but, rather, permits deviation and deflection from the alignment of the guide track 56.

The control guideway 12 provides an inexpensive and readily placed and realigned structure to provide a command datum with which the path or track of the vehicle 1, 1a, which it actually is to carry out, can be controlled. The arrangement, also, permits variation in path, for example to permit repair of a roadway or the like, to compensate for changes in level, depressions and the like. If the vehicle should deviate from a commanded path—either directly beneath the guide assembly 56, or deflected—any change from the commanded direction will cause relative movement between the connecting element 4, 4a and the reference element 15, for example the roller 15, and/or its operating shaft 16, which is sensed as a deflection from the desired 90°-relationship between the connecting element 4, 4a and the shaft 16, for example, and will cause an error signal to occur within the control unit, to guide the vehicle or car 1 back to the commanded path.

The guideway 12 can be integrated with the assembly 56 or may be constructed in form of a separate rail. Constructing the guideway 12 as a separate rail which, of course, may be attached to the guideway 56, has the advantage that the relative orientation of the guideway 12 with respect to the guide tracks 6, 6a can be easily changed, right at the point where the change is desired, and thus permit resetting of the travel path of the vehicle 1 at any time, for example to accomodate temporary obstructions of the normally commanded path, and the like. Preferably, the reference element 15 is merely a roller, for example a cam roller, which rolls along the guideway, sensing its relative orientation with respect to the guide rails 6. Spring loading of the roller 15 or of the shaft 16 provides for continuous engagement of the roller 15 with the guideway 12.

The arrangement in which the guideway 12 is a rail which changes its level with respect to the rails 6 is particularly preferred since resetting of the guideway 12 can be easily accomplished. The vertical offset, above or below the guide rails, in dependence on the desired deflection, thus permits ready change of the path of the vehicle, deflection towards the right or left as desired—see FIG. 3. Orientation of the guideway 12 with respect to the rails 6, for example on an even level, then provides for precise guidance of the vehicle or car 1 beneath the guideway assembly 56. A continuous guideway 12 has the advantage that the previously necessary relocation of the entire assembly 56 is eliminated, and the much simpler resetting of the guideway 12 only is used to control the actual path of the vehicle or car 1, 1a, by controlling the steering thereof in accordance with deviation of the guideway 12 from a reference datum, for example provided by the rails 6. The guideway 12, thus, provides the command for the path of the vehicle, regardless of the position of the assembly 56. The connecting element between the vehicle or car 1 and the current pickup 5 and the guideway 6 then must be adjustable in length, to permit the lateral deflection of the vehicle, for example by a telescoping rod 4, or the spring-loaded cable 4a (FIG. 3).

Sensing relative movement of the reference element, i.e. the roller 15 and/or the connecting shaft or link 16 in the angle measuring apparatus 11a can be done not only by potentiometers but, also, for example by energizing a coil with a movable armature being coupled to the shaft or rod 16, so that, as the level of the guideway 12, changes the armature dips into the coil, more or less, which will change the coil voltage. Upon deviation of coil voltage from a predetermined command value, the vehicle is steered in such a manner that the deflection is returned to null or zero, so that, then, the insertion depth of the armature into the coil will again have its commanded value—which indicates that the vehicle is on the commanded path. In accordance with a particularly preferred embodiment, the reference element is pivotably located on its shaft 16, and its pivotable position forms the command value for the control unit, the angle sensor being secured to the link 7' on the carriage 7 which runs in the guideway, so that the orientation of the connecting element 4, 4a with respect to shaft or link 16 will provide an actual value, the servo system tending to so steer the vehicle that the actual and command value agree, that is, to null any error angle $\Delta a$, respectively.

Pivotable connection 11 is particularly preferred since it is a very simple arrangement, and permits easy sensing of the relative orientation of the connecting element 4, 4a with respect to the link 16 supported from the carriage running in the assembly 56 and/or the shaft 16. The joint 11 can have the angle or path deflection measuring system 11' integrated therewith, which forms a simple, easily maintained and clearly checked assembly. It is, however, also possible to provide electrical external control units which enter a command angle into the pivot joint 41 on the vehicle, and if differing from a 90°-relationship with respect to the carriage 1, 1a, to control the steering motor 17 to cause the deflection of the vehicle from a path beneath the assembly 56. This is particularly desirable if abrupt change in direction is to be carried out, for example a 90°-deflection of a steering caster or wheel of the vehicle, to be able to move the vehicle into a holding or loading position with minimum space requirement therefor. Transition from control by the guideway 12 to electrical control can be carried out, for example, by voltage or current pulses or specifically coded pulse trains transmitted or communicated to the vehicle at a predetermined time or when the vehicle has reached a predetermined position on its path.

The control system for use of the vehicle, as schematically shown in FIG. 4, is simple and standard. The angle sensor 11a provides an actual output signal a act which is compared in a comparator 101 with the command output signal $a_{com}$ from the memory 100. The comparator 101 provides a deviation or error signal $\Delta a$ to a steering control unit 102 which, then, in accordance with the direction and magnitude of the error signal $\Delta a$, controls a steering control unit 102, of standard construction, to provide a steering command output to an amplifier 103 which, in turn, controls the steering motor 17. Steering motor 17 is coupled to a steered wheel, for example a steered caster 17a, to provide the required and commanded deflection to the vehicle in a direction and magnitude to null the error or deviation signal $\Delta a$.

Various changes and modifications may be made, and any features described herein may be used with any of the others, within the scope of the inventive concept.

I claim:

1. A variable-path, directionally controlled surface transport system having
    an electrically driven vehicle (1) for operation on a surface, and having a steering system (17, 17a);
    an overhead system (56, 56') including current supply conductors (5) and direction control rails (6, 6a);
    a connecting element (4, 4a) connecting the vehicle to the current supply conductors to receive drive energy, and to the direction control rails (6, 6a) to receive direction information data therefrom to guide the path of the vehicle,
    and comprising, in accordance with the invention,
    a further control guideway (12) located adjacent the overhead system;

feeler means (15, 16) sensing the relative position of the further control guideway with respect to the overhead system (56);

and a comparator (11, 11a, 101) coupled to the feeler means and to the connecting element for generating path deviation control signals (Δa), said path deviation control signals being applied to the steering system (17, 17a) of the vehicle (1, 1a) to steer the vehicle along a path which may be, at any selected point, laterally offset a selected distance with respect to said overhead conductors (5) and rails (6, 6a), as a function of the relative position of the guideway (12) with respect to the connecting element (4, 4a).

2. System according to claim 1, wherein the feeler means (15) comprises a reference element (15, 16) and means (11a) to provide a signal representative of the relative orientation of the reference element and the connecting element to the vehicle;

and a control system (19; 101, 102, 103) is provided, which includes said comparator, to control the steering system (17) of the vehicle to null any deviation of the position of the reference element relative to the connecting element (4, 4a) from a predetermined value.

3. System according to claim 1, wherein the connecting element comprises a length-adjustable elongated connecting link (4, 4a) which is pivotably mounted for pivoting movement transverse to the direction of the path of the vehicle (1, 1a) at a lower attachment pivot (41, 41a) on the vehicle, and additionally pivotably mounted at an upper pivot (11) on a carriage (7) movable on the direction control rails (6).

4. System according to claim 3, wherein the connecting link comprises a telescoping rod (4).

5. System according to claim 3, wherein the connecting link comprises a spring-loaded (S) connecting cable (4a).

6. System according to claim 1, wherein the control guideway (12) is an integrally secured overhead system (56, 56a).

7. System according to claim 1, wherein the control guideway (12) comprises a rail.

8. System according to claim 7, wherein the rail (12) of the control guideway is suspended individually in rail sections at selected levels having a predetermined position with respect to the direction control rails (6) to control, by the relative position with respect to the control rails, lateral deflection of the vehicle from a position beneath the overhead system (56).

9. System according to claim 7, wherein the feeler means comprises a roller rolling on the rail forming the control guideway.

10. System according to claim 7, wherein the rail forming the control guideway is vertically shifted with respect to the position of the guide rails (6) in those regions in which the vehicle (1) is to deviate from a path beneath the overhead system (56).

11. System according to claim 1, further including an overhead carriage (7) operable on the direction control rails (6) and including means (10) to receive electrical energy from said current supply conductors (5);

a pivot joint (11) secured to an upper end of the connecting element (4, 4a);

and a connecting means (16) connecting the feeler means (15) to the pivot joint, permitting relative pivotable movement with respect to the carriage (7) and with respect to the connecting element (4), the pivotable position of the connecting means coupled to the feeler providing a command value representative of a predetermined angle between the connecting means to the feeler and the connection element (4, 4a).

12. System according to claim 1, including a pivot joint (11) connecting the connection element (4, 4a) to the feeler means (15, 16);

and means (11a) sensing the relative angular position between the connection element (4, 4a) and the feeler means (15, 16), a predetermined angular position providing a command value or parameter which is being applied to said comparator, for comparison with an actual angular position between the connecting element and the feeler means.

13. System according to claim 12, further including an angle sensor (11a) located on said joint (11).

14. System according to claim 11, further including an angle sensor (11a) located on said joint (11).

15. System according to claim 1, further including an electrical command value source (100) connected to said comparator (101) and additionally providing command signals to the comparator (101) to cause the comparator to generate path deviation control signals superimposed upon or indedependently of the respective positions of the feeler means (15, 16) and the overhead system (56).

16. System according to claim 15, wherein the command value source comprises a memory (100) selectively and controllably applying selected outputs thereof as said additional or substitute signals to the comparator.

17. A method of controlling the path of a surface vehicle in which an overhead system (56) including current supply conductors (5) and direction control guide rails (6) is coupled to a car or vehicle (1) by a connecting element (4) connecting the vehicle to the current supply conductors, and further providing direction control information to steer the vehicle in a path which is, at each point along said path, a preselected distance laterally from a position directly beneath the overhead system, as a function of the orientation of the connecting element (4, 4a) with respect to the guide rails (6), comprising the steps of generating direction control signals which correspond to said preselected distances and are arbitrary with respect to the instantaneous orientation of the connecting element (4, 4a) with respect to the guide rails (6); and controlling the direction of movement of said vehicle in accordance with said control signals.

18. Method according to claim 17, wherein the step of generating the control signals independently of the position of the guide rails (6) comprises positioning a control guideway (12) adjacent the overhead system (56) including said guide rails (6);

sensing the relative orientation of said control guideway with respect to the connecting element and generating said command signal as a function of the relative position of the guideway and the connecting element to thereby provide a command signal representative of said relative position, and arbitrary with respect to the position of the vehicle with respect to the overhead system (56) only.

19. Method according to claim 18, wherein said control guideway comprises an elongated cam way;

and the step of generating said command signal comprises sensing the the instantaneous position of the cam guideway with respect to the connecting element, and deriving a deflection signal, said deflection signal forming the command signal to control the path of movement of said vehicle.

20. Method according to claim 19, wherein said deflection signal comprises an angular measurement signal.

* * * * *